United States Patent [19]

Sato

[11] Patent Number: 5,379,959
[45] Date of Patent: Jan. 10, 1995

[54] FISHING REEL HAVING ONE-WAY BRAKE

[75] Inventor: Jun Sato, Sakai, Japan

[73] Assignee: Shimano Inc., Osaka, Japan

[21] Appl. No.: 118,639

[22] Filed: Sep. 10, 1993

[30] Foreign Application Priority Data

Sep. 11, 1992 [JP] Japan .................. 4-063679[U]

[51] Int. Cl.$^6$ ........................................... A01K 89/033
[52] U.S. Cl. ............................................... 242/299
[58] Field of Search .............. 242/260, 261, 299, 298, 242/297, 247; 188/82.3, 82.34, 265

[56] References Cited

U.S. PATENT DOCUMENTS

| | | | |
|---|---|---|---|
| 1,547,238 | 7/1925 | Russell et al. | 242/299 X |
| 2,146,582 | 2/1939 | Kohlhepp | 242/268 |
| 3,612,437 | 10/1971 | Allebach | 242/268 X |
| 5,178,343 | 1/1993 | Sato | 242/298 X |
| 5,285,985 | 2/1994 | Sakaguchi | 242/299 X |

Primary Examiner—Katherine Matecki
Attorney, Agent, or Firm—Dickstein, Shapiro & Morin

[57] ABSTRACT

A fishing reel comprising a reel body, a spool for taking up a fishing line, a handle for transmitting drive to the spool, a transmission shaft for transmitting drive from the handle to the spool, and a one-way brake for preventing rotation of the transmission shaft in a fishing line feeding-out direction. The one-way brake is a rolling type and includes a rolling element disposed between an inner race and an outer race. The outer race is unrotatably supported by the reel body, while the inner race is rotatably fitted on said transmission shaft. The fishing reel further comprises an engageable member operable in an axial direction of the transmission shaft, thereby to select between a connecting position to engage the inner race to be integral with the transmission shaft and a separating position to move away from the inner race.

8 Claims, 5 Drawing Sheets

FISHING REEL HAVING ONE-WAY BRAKE

BACKGROUND OF THE INVENTION

1. Field of the Invention

The present invention relates to a fishing line, and more particularly to a fishing reel comprising a transmission shaft for transmitting drive from a handle to a spool, and an improved one-way brake for preventing the transmission shaft from rotating in a fishing line feeding-out direction.

2. Description of the Related Art

A baitcasting reel as an example of conventional reels as described above comprises a ratchet wheel with respect to a handle shaft (transmission shaft) connected to the handle, and a pawl engageable with the ratchet wheel, thereby to prevent the handle shaft from rotating in the fishing line feeding-out direction while permitting the handle shaft to rotate in a fishing line winding-up direction (c.f. Japanese Utility Model Publication 'Kokai' No. 61-182263).

According to such conventional reels including the ratchet wheel type one-way brake mounted on the transmission shaft, the pawl engages a toothed portion of the ratchet wheel to prevent rotation of the transmission shaft. As a result, a gap defined by the toothed portion of the ratchet wheel creates play in a peripheral direction of the wheel. When a fish bites and the angler fights with the fish when swinging the rod, for example, the transmission shaft is rotated in the fishing line feeding-out direction by the play and then the pawl engages the toothed portion of the ratchet wheel to prevent rotation of the transmission shaft, which results in retard in time before the fighting action is completed.

In order to overcome such inconvenience, the reels including a rolling type one-way brake having a rolling element disposed between an inner race and an outer race for eliminating play in the fishing line feeding-out direction are currently commercially available.

However, unlike the ratchet wheel type one-way brake, such a one-way brake is not capable of permitting rotation in the fishing line feeding-out direction through an operation from the outside, which needs further improvements.

In an actual fishing operation, any foreign substance such as a fishing line enters the handle mechanism inadvertently. Thus, it is required that a reverse rotation checking function of the one-way brake is released to permit rotation of the handle in the fishing line feeding-out direction such that the foreign substance is removed by reverse rotation of the handle mechanism. In many cases of boat fishing, a trick or a lure is cast with the spool being directly connected to the handle without disengaging the brake mechanism mounted between the handle and the spool. For the purpose of making such a type of fishing possible, it is required that the aforementioned reels having the rolling type one-way brake allow the transmission shaft to make reverse rotation.

SUMMARY OF THE INVENTION

A primary object of the present invention is to provide an improved fishing reel for permitting a transmission shaft to rotate in a fishing line feeding-out direction, when necessary, without ruining the advantageous aspect of eliminating play by provision of a rolling type one-way brake.

In order to fulfill the above-noted object, the present invention is characterized by a fishing reel comprising a one-way brake for preventing rotation of a transmission shaft in a fishing line feeding-out direction, wherein the one-way brake includes a rolling element such as a ball or a roller disposed between an inner race and an outer race, and the outer race is unrotatably supported by a reel body while the inner race is rotatably fitted on the transmission shaft, and further comprising an engageable member operable in an axial direction of the transmission shaft, thereby to select between a connecting position to engage the inner race to be integral with the transmission shaft and a separating position to move away from the inner race.

The above structure has the following functions and effects.

With the construction as shown in FIGS. 1 through 3, when a force of rotation is applied to the transmission shaft 9 in the fishing line feeding-out direction with the engageable member 22 being set to the connecting position, the force of rotation of the transmission shaft 9 is transmitted to the inner race 19 through the engageable member 22. Then, the rolling element 21 is instantaneously engaged between the inner race 19 and the outer race 20, which prevents rotation of the transmission shaft 9. When the engageable member 22 is placed to the separating position, the inner race 19 is freely rotatable with respect to the transmission shaft 9, which makes the one-way brake A ineffective and permits rotation of the transmission shaft 9 in the fishing line feeding-out direction. Since the engageable member 22 is operated in the axial direction of the transmission shaft 9, engagement and disengagement of the engageable member 22 may be simple by employing a construction in which the engageable member 22 is slidably fitted on the transmission shaft 9 and a control system for operating the engageable member 22 is housed in the transmission shaft 9 as shown in FIG. 5, for example.

Thus, the above construction allows the rolling type one-way brake to perform a function to eliminate play and also allows the engageable member 22 to change its position by a simple engagement mechanism without significantly changing the mechanism of the one-way brake, thereby to permit rotation of the transmission shaft 9 in the fishing line feeding-out direction.

As a result, the fishing reel for eliminating play of the transmission shaft to allow a quick fighting operation by using the rolling type one-way brake as well as to permit rotation of the transmission shaft in the fishing line feeding-out direction, when necessary, is realized without employing any complicated structure.

Other objects, advantages and features will be apparent from the following description in reference to the accompanying drawings.

DETAILED DESCRIPTION OF THE PREFERRED EMBODIMENTS

Figure 1:
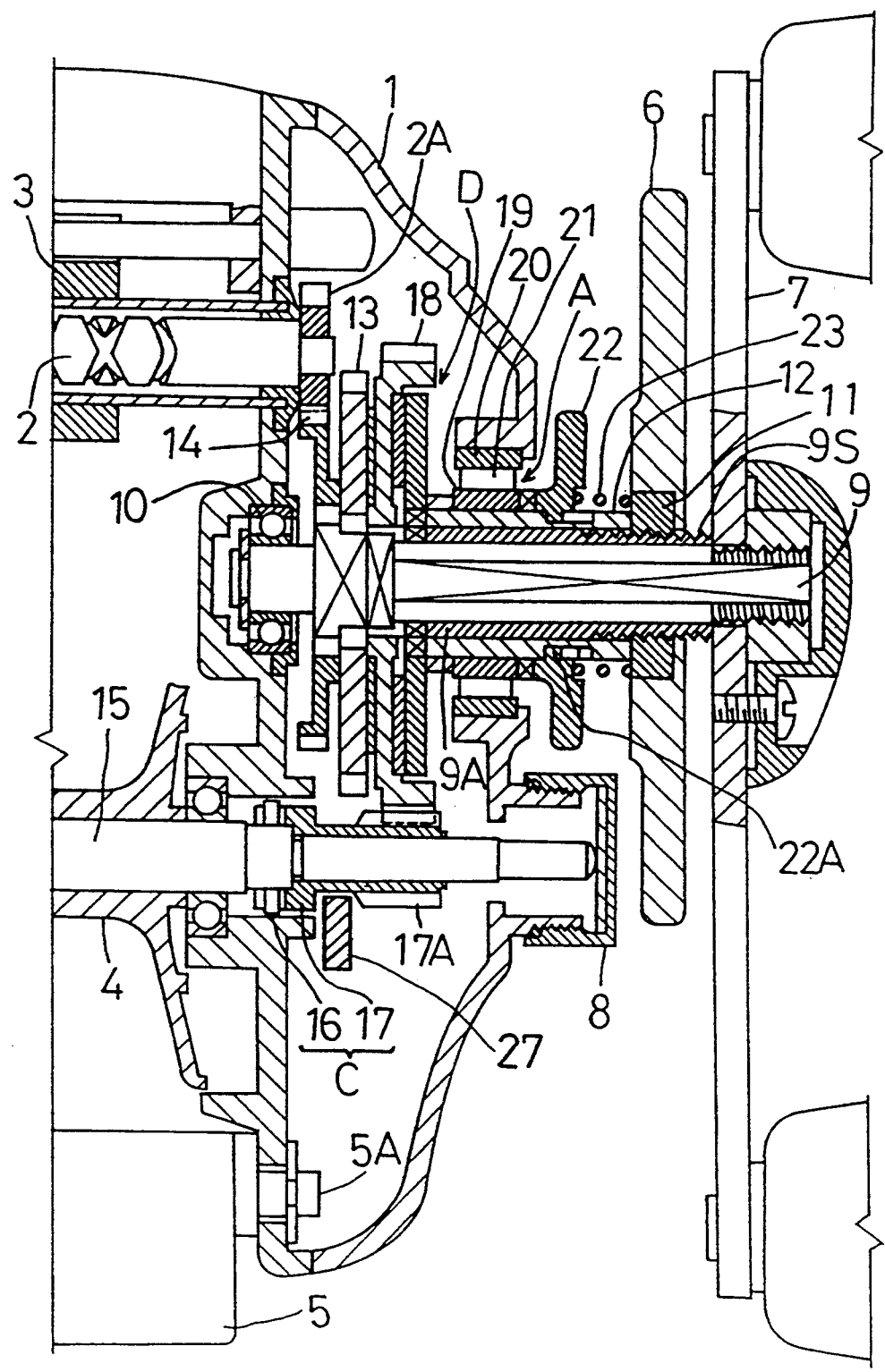
FIG. 1 is a cross sectional plan view of a fight part of a reel according to the present invention.

An embodiment of a fishing reel according to the present invention will be described in detail hereinafter referring to the drawings.

FIGS. 1 through 4 show a baitcasting reel comprising fight and left side cases 1 constituting a reel body, a level wind mechanism including a helical groove shaft 2 rotatable to reciprocate a line guide element 3 sideways, a spool 4 for taking up a fishing line (not shown), a clutch control element 5, a drag control element 6, a handle 7 and a cast controller 8. The level wind mechanism, the spool 4 and the clutch control element 5 are disposed between the fight and left side cases 1 while the drag control element 6, the handle 7 and the cast controller 8 are disposed outwardly of the fight side case 1.

A handle shaft 9 connected to the handle 7 and acting as a transmission shaft is supported by the right side case 1 through a ball bearing 10 at an inner end thereof and a rolling type one-way brake at an outer end thereof. The drag control element 6 includes a nut 11 screwed to a threaded portion 9S defined in a sleeve member 9A rotatable in unison with the handle shaft 9. When the drag control element 6 is rotated, the pressing force caused by the nut 11 is transmitted to a drag mechanism D through a further sleeve 12 fitted on the sleeve member 9A of the handle shaft 9.

The sleeve 12 and the sleeve member 9A are engageable with a disk of the drag mechanism D to be rotatable in unison with the handle shaft 9.

The handle shaft 9 includes the drag mechanism D, a wheel 13 and a transmission gear 14. The transmission gear 14 is meshed with an input gear 2A of the helical groove shaft 2 of the level wind mechanism to drive the level wind mechanism. The spool 4 is rotatable with a spool shaft 15. A clutch mechanism C includes an engaging pin 16 disposed in an intermediate portion of the spool shaft 15 and an engageable and disengageable clutch sleeve 17. In a clutching position, an output gear 18 of the drag mechanism D is meshed with an input gear 17A of the clutch sleeve 17 to transmit drive from the handle 7 to the spool 4. A clutch yoke 27 moves the clutch sleeve 17 to engage or disengage the clutch mechanism.

When the clutch control element 5 is pressed down, a pin 5A disposed on the control element 5 exerts its operative force to cause the clutch sleeve 17 to disengage from the engaging pin 16, thereby to disengage the clutch mechanism C. When the handle 7 is rotated in a direction to wind up the fishing line in the declutching position, the wheel 13 is operable to restore the clutch mechanism C to the clutching position (the detailed mechanism of the wheel is not referred to any further).

Figure 2:
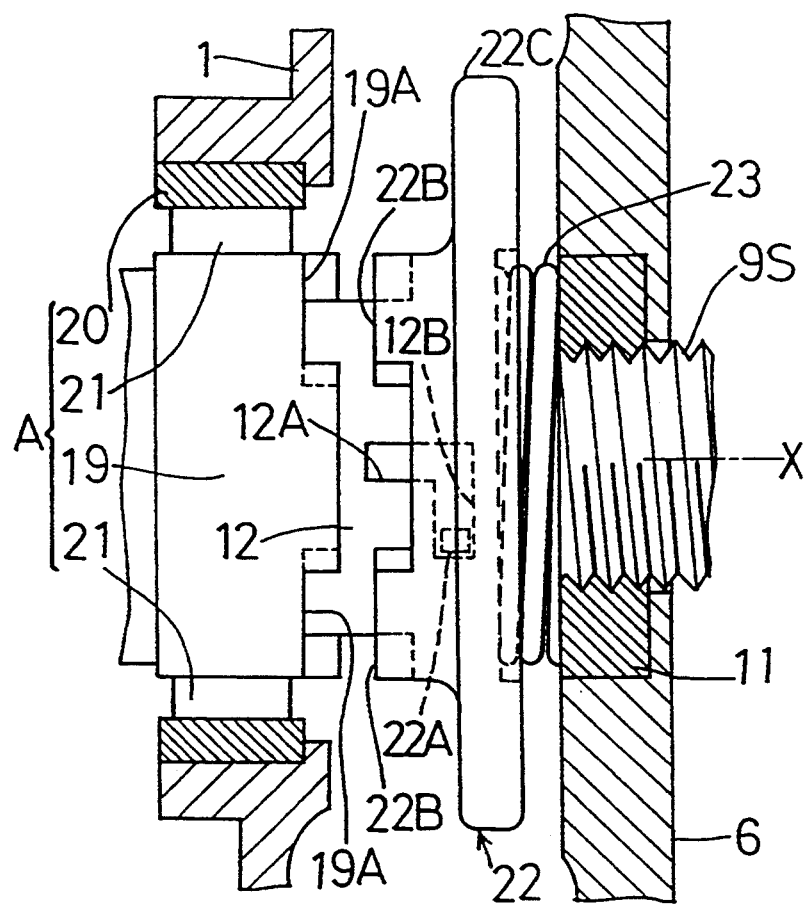
FIG. 2 is a partially broken plan view showing an engagement mechanism of the present invention.
Figure 3:
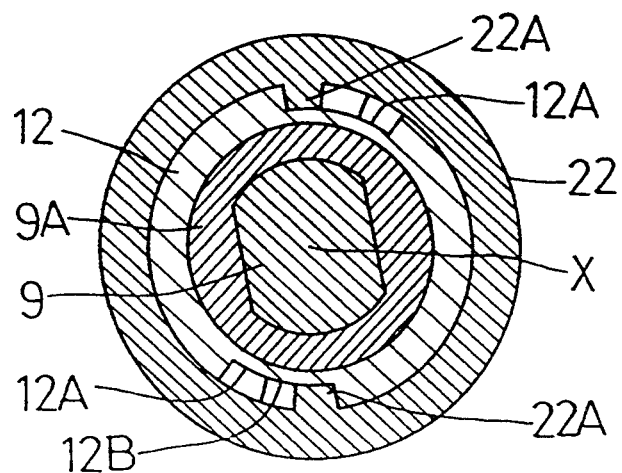
FIG. 3 is a vertical sectional side view showing a hooking mechanism of an engageable member.
Figure 4:
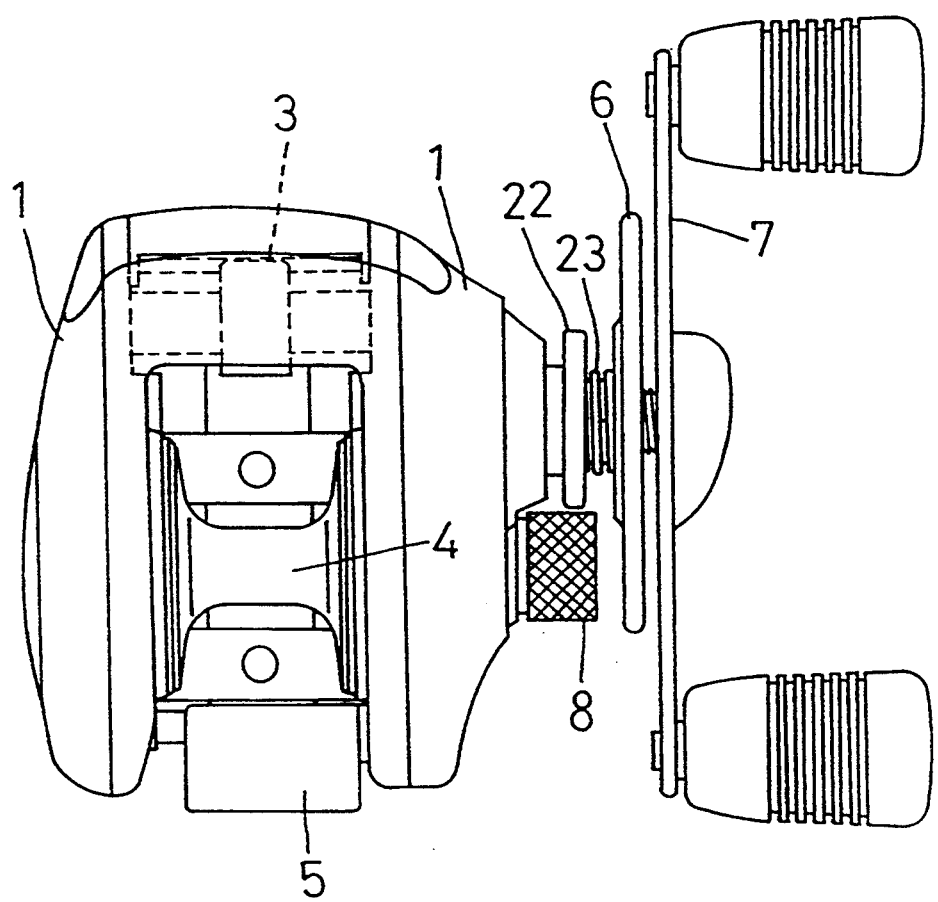
FIG. 4 is a plan view of a baitcasting reel.

As seen from FIGS. 2 and 3, the one-way brake A is a rolling type including a rolling element 21 having a roller disposed between an inner race 19 and an outer race 20. The outer race 20 of the one-way brake A is unrotatably supported by the side case 1 acting as the reel body. The inner race 19 is rotatably fitted on the handle shaft 9. An engageable member 22 is provided to select between a connecting position to engage the inner race 19 as operated in an axial direction of the handle shaft 9 to be integral with the handle shaft 9 and a separating position to move away from the inner race 19. When the engageable member 22 is set to the position to engage the inner race 19, rotation of the handle shaft 9 in a fishing line feeding-out direction is quickly prevented. On the other hand, when the engageable member 22 is set to the separating position, reverse rotation of the handle shaft 9 (rotation in the fishing line feeding-out direction) is permitted.

The engageable member 22 is urged toward the one-way brake A by a spring 23 acting as a resilient element and includes lugs 22A defined in an inner face thereof to be engaged in grooves 12A defined in the axial direction X of the sleeve 12 An engageable piece 22B is axially movable to be engageable with and disengageable from an engaged portion 19A defined in an end surface of the inner race 19. Also, a control element 22C for manually operating the engageable member 22. As shown in FIG. 2, each groove 12A defined in an outer face of the sleeve 12 is associated with a hook portion 12B.

Referring to FIG. 1, the handle shaft 9 is integrally connected to the inner race 19 to quickly prevent reverse rotation of the handle shaft 9 with the engaged portion 19A of the inner race 19 being engaged with the engageable piece 22B of the engageable member 22. Also, as shown in FIG. 2, the engageable member 22 is maintained in the separating position to permit both of normal and reverse rotation of the handle shaft 9 with the engaged portion 19A of the inner race 19 being moved away from the engageable piece 22B of the engageable member 22 to place the lug 22A of the engageable member 22 to the hook portion 12B of the groove 12A.

A different embodiment will be described next.

Figure 5:
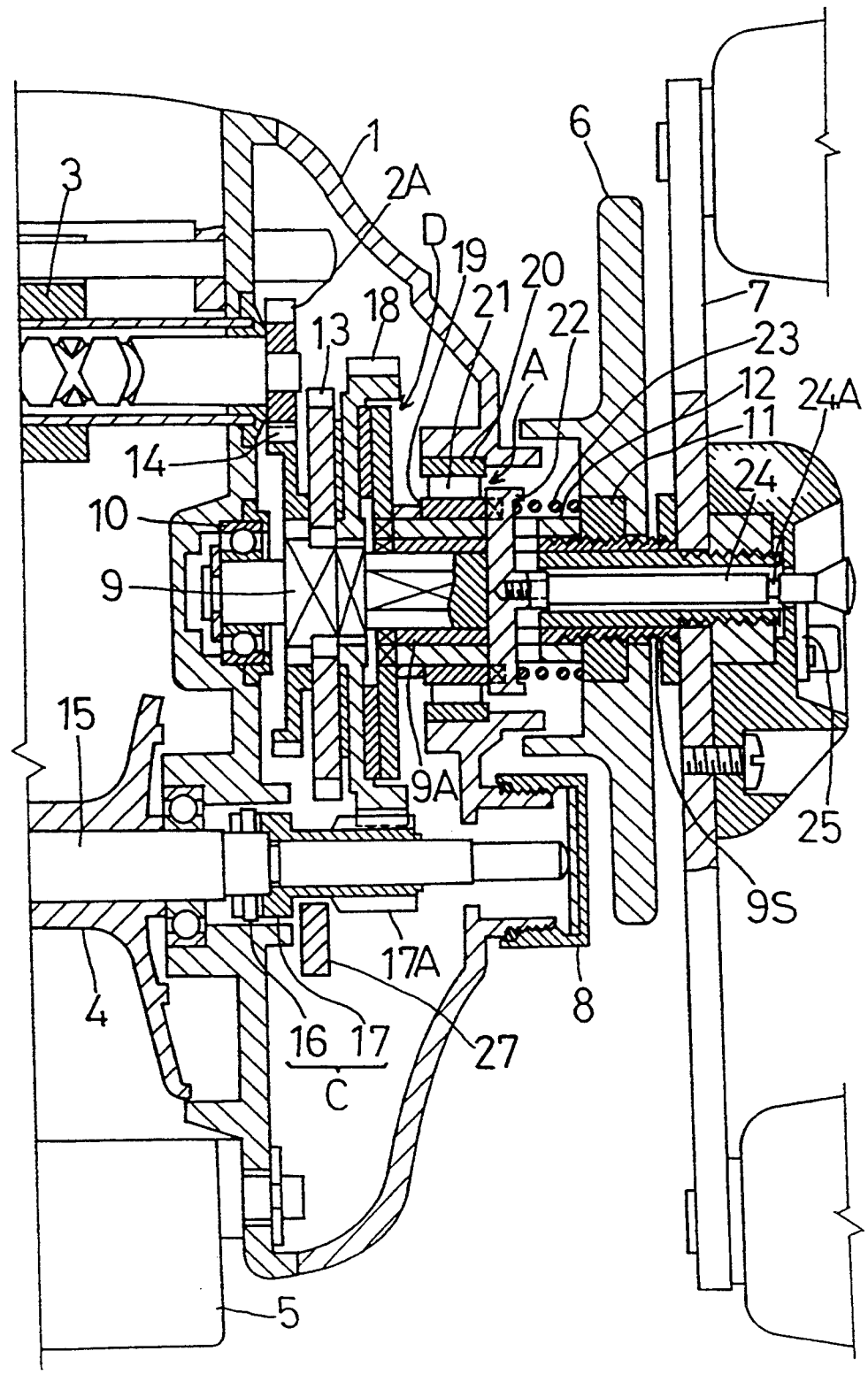
FIG. 5 is a cross sectional plan view of a right part of a reel according to another embodiment.
Figure 6:
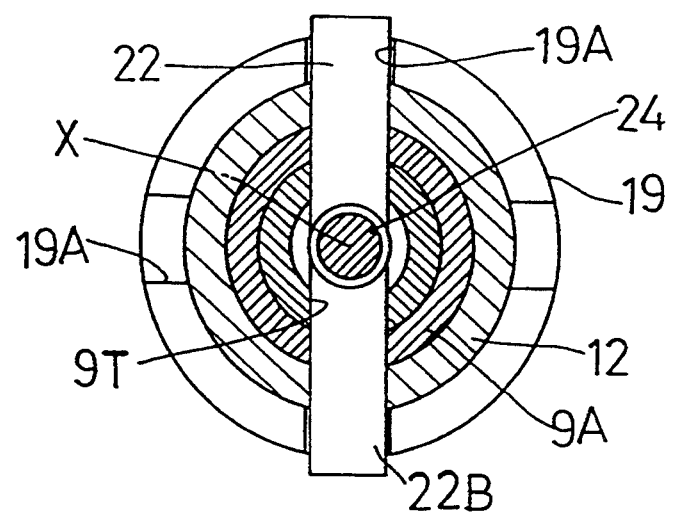
FIG. 6 is a vertical sectional side view of the engageable member according to the another embodiment.
Figure 7:
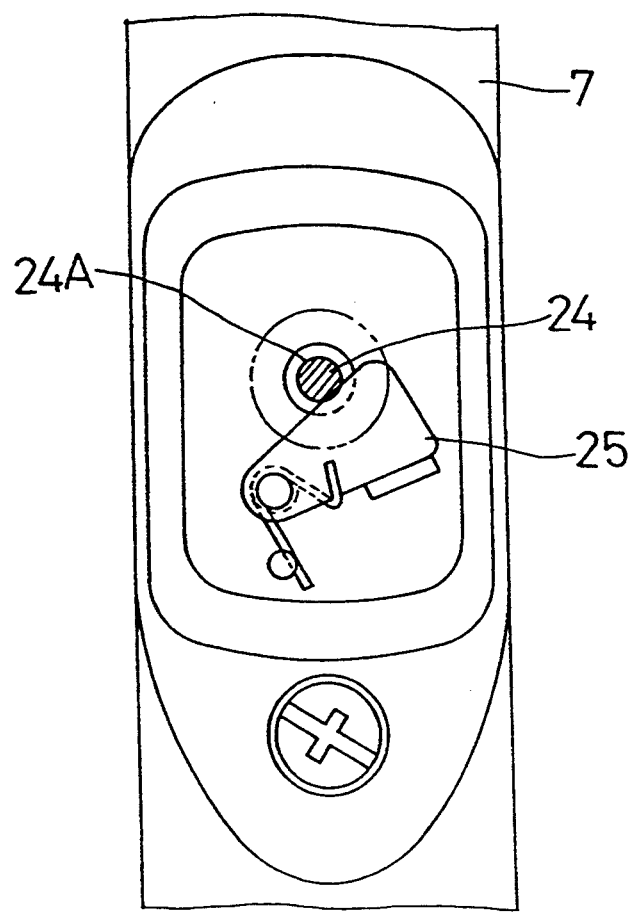
FIG. 7 is a side view of an engagement mechanism of a control shaft.

Apart from the foregoing embodiment, the present invention may be practiced as shown in FIGS. 5 to 7. With this construction, the engageable member 22 is disposed in a slot 9T radially defined in the handle shaft 9 to be slidable in the axial direction of the handle shaft 9 with the engageable piece 22B defined in an end portion of the member 22 projecting outwardly of an outer periphery of the handle shaft 9. A control shaft 24 mounted coaxially with the handle shaft 9 allows the engageable member 22 to select between the connecting position and the separating position. When the engageable piece 22B engages the engaged portion 19A of the inner race 19 under an urging force of the spring 23, reverse rotation of the handle shaft 9 is quickly prevented. The control shaft 24 is operable to be pulled out to engage a stopper 25 with an annular groove 24A of the control shaft 24 to place the engageable member 22 to the separating position, thereby to permit both of normal and reverse rotation of the handle shaft 9.

According to the present invention, the rolling type one-way brake may be mounted in a transmission line other than the handle shaft and may include the engageable member provided in the transmission line.

What is claimed is:
1. A fishing reel comprising:
   a reel body;
   a spool for taking up a fishing line;
   a handle for transmitting drive to said spool;
   a transmission shaft for transmitting drive from said handle to said spool;
   a one-way brake for preventing rotation of said transmission shaft in a fishing line feeding-out direction, said one-way brake including a rolling element disposed between an inner race and an outer race, said outer race being unrotatably supported by said reel body, said inner race being rotatably fitted on said transmission shaft; and an engageable member movable in a direction parallel to a longitudinal axis of said transmission shaft between a connecting position wherein said engageable member connects said inner race to rotate integrally with said transmission shaft and a separating position wherein said inner race rotates relative to said transmission shaft.

2. A fishing reel as claimed in claim 1, wherein said rolling element of said one-way brake comprises a ball.

3. A fishing reel as claimed in claim 1, wherein said rolling element of said one-way brake comprises a roller.

4. A fishing reel as claimed in claim 1, further comprising a resilient element which urges said engageable member toward said connecting position to connect said inner race to said transmission shaft, said engageable member having a retaining mechanism for maintaining the engageable member in said separating position to separate said inner race from said transmission shaft, and a control portion for manually operating said engageable member.

5. A fishing reel as claimed in claim 4, wherein said retaining mechanism comprises a lug projecting from said engageable member and engaged in a groove defined in a sleeve non-rotatably fitted on said transmission shaft, and an engageable piece on said engageable member, said engageable piece being engageable with and disengageable from an engaged portion defined in an end surface of said inner race upon movement of said engageable member from said connecting position to said separating position.

6. A fishing reel as claimed in claim 5, wherein said groove defined in an outer face of said sleeve comprises an axially extending portion and a circumferentially extending hook portion.

7. A fishing reel as claimed in claim 1, wherein said engageable member is disposed in a radial slot in said transmission shaft and is slidable in the axial direction of the shafts, said engageable piece comprising an end portion of the engageable member projecting outwardly of the outer surface of the transmission shaft.

8. A fishing reel as claimed in claim 7, wherein said control portion comprises a control shaft fixed to said engageable member, coaxially mounted with said transmission shaft, and having an annular groove, and a stopper engageable with said annular groove of the control shaft when said control shaft is placed in said separating position to permit both of normal and reverse rotation of said transmission shaft.

* * * * *